No. 808,193. PATENTED DEC. 26, 1905.
J. F. BUSSELLS.
CONTINUOUS SCREW PRESS.
APPLICATION FILED JAN. 4, 1905.
2 SHEETS—SHEET 1.
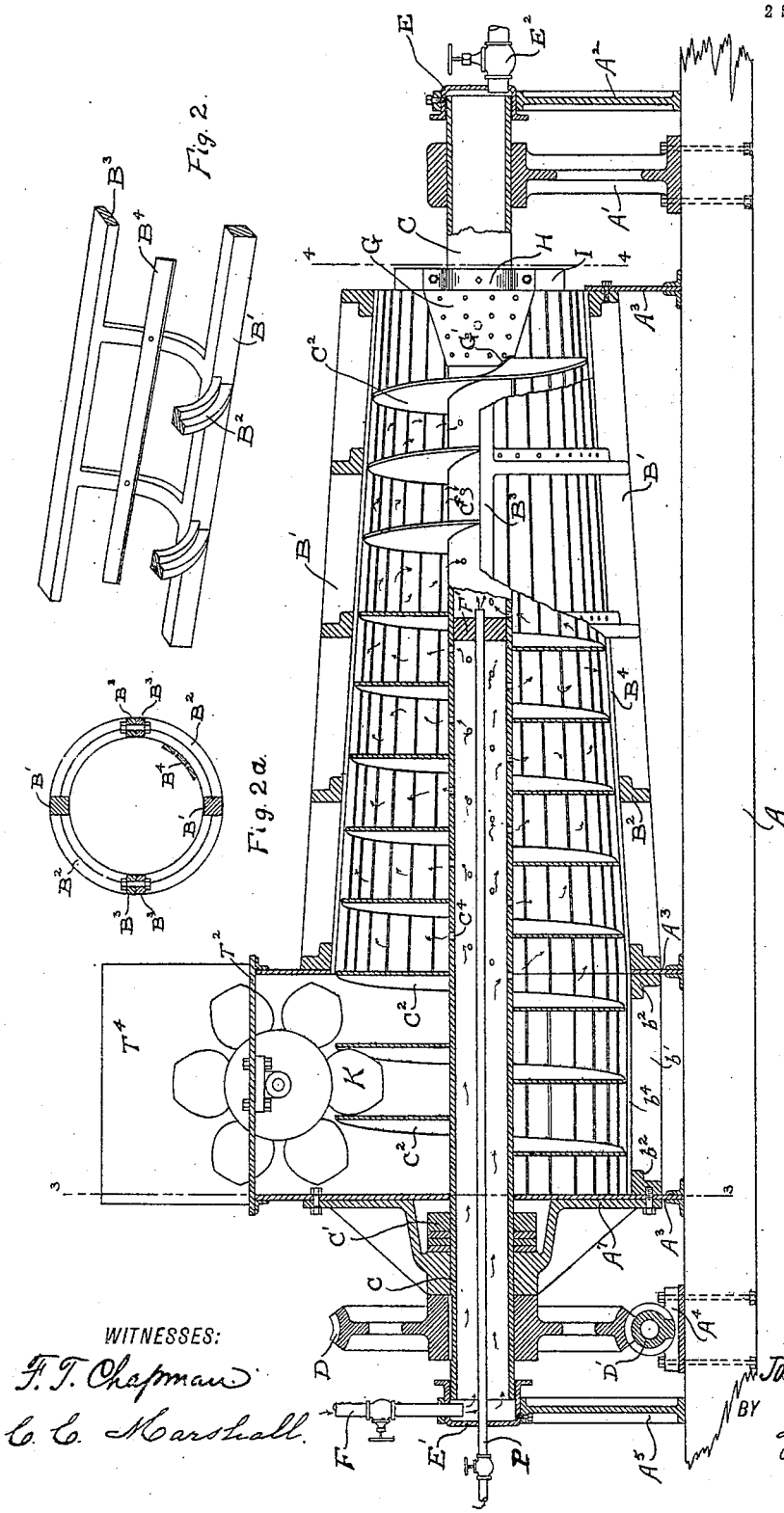
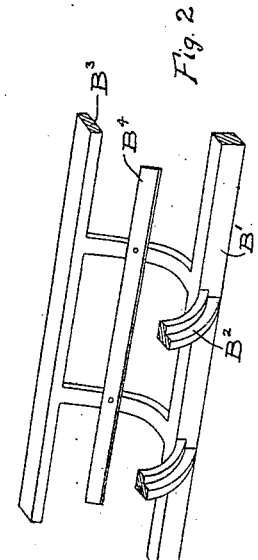
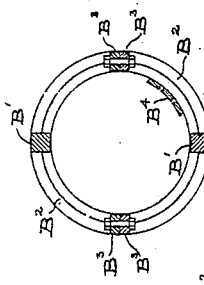
WITNESSES:
F. T. Chapman
C. C. Marshall
INVENTOR:
Josephus F. Bussells,
BY
Lyon & Rising.
ATTORNEYS.

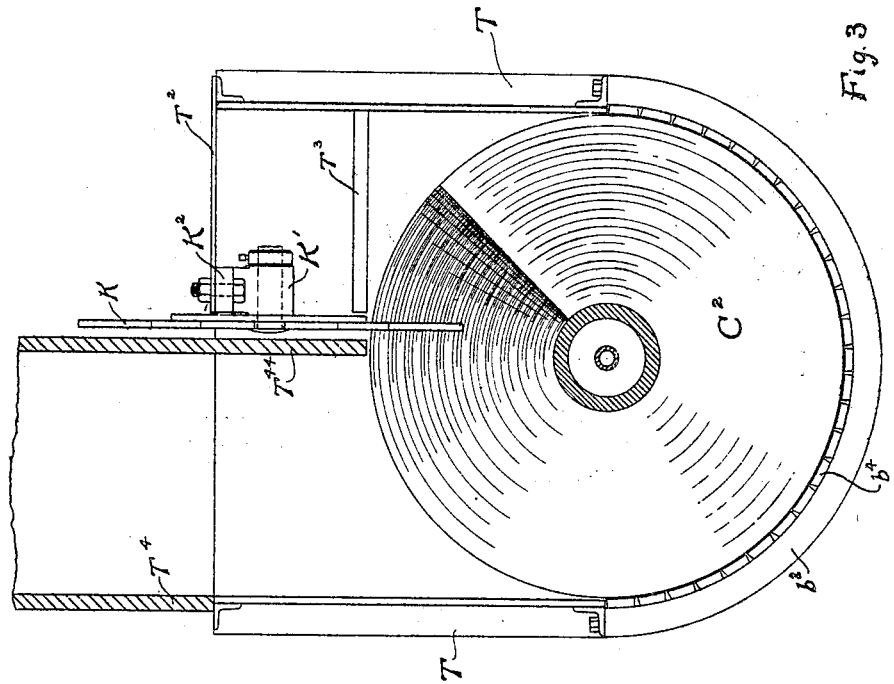
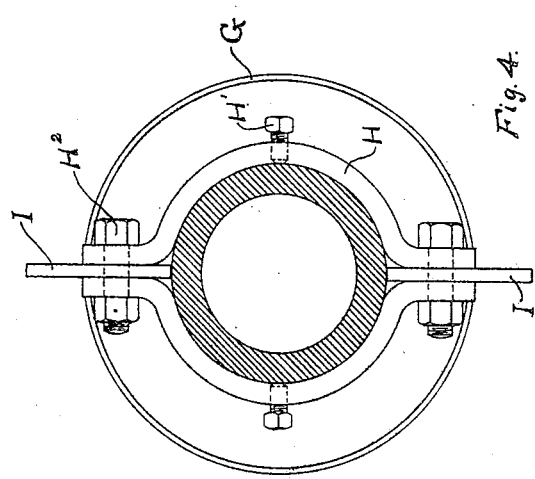

UNITED STATES PATENT OFFICE.

JOSEPHUS F. BUSSELLS, OF IRVINGTON, VIRGINIA, ASSIGNOR TO AMERICAN PROCESS COMPANY, OF NEW YORK, N. Y., A CORPORATION OF WEST VIRGINIA.

CONTINUOUS SCREW-PRESS.

No. 808,193.  Specification of Letters Patent.  Patented Dec. 26, 1905.

Application filed January 4, 1905. Serial No. 239,636.

*To all whom it may concern:*

Be it known that I, JOSEPHUS F. BUSSELLS, a citizen of the United States, and a resident of Irvington, Lancaster county, Virginia, have invented new and useful Improvements in Continuous Screw-Presses, of which the following is a specification.

In the drawings, Figure 1 is a longitudinal cross-section of the screw-press, a portion being shown in elevation. Figs. 2 and $2^a$ show in detail a portion of the frame of the press. Fig. 3 shows a cross-section on the line 3 3 of Fig. 1, and Fig. 4 shows a cross-section on the line 4 4 of Fig. 1.

Upon a base A, I mount standards $A^3 A^3$, to which I rigidly secure the frame of the screw-press. This frame is cast in the form of two semiconical cages, which are united along a median plane to form a complete frusto-conical cage. Each semiconical cage is composed of a central longitudinal bar $B'$ and two lateral longitudinal bars $B^3$, which are cast in one piece with semicircular transverse connecting-arms $B^2$, it being understood that the two lateral bars $B^3$ of one semiconical cage fit upon and are rigidly bolted to the corresponding lateral bars of the other semiconical cage, as is indicated in the cross-sectional view of Fig. $2^a$. To the inside surface of the frusto-conical cage thus constituted are bolted the slats $B^4$, whose side faces are beveled in such a manner that the slats when adjacently arranged present apertures therebetween which widen outwardly.

The frusto-conical cage thus far described is completed at the feed end by an extension shown in the form of a semicylindrical cage having longitudinal bars $b'$, curved semicircular arms $b^2$, and connecting-slats $b^4$. To the top of this semicylindrical extension is bolted the feed-box T, to be hereinafter more fully described.

Working within the press-body, the construction of which has just been made clear, are the flanges $C^2$ of an Archimedean screw, which are secured in any convenient manner to the hollow rotary shaft C, having bearings in the standard $A'$ at the discharge end of the press and in a central orifice in the stationary plate $A^7$, bolted to the stationary body or frame of the press at its feed end. The thrust of this screw upon its bearings being in the direction of the feed end of the press is taken up by the common expedient of shrinking a metal ring $C'$ upon the tube C and of interposing one or more rings of different metals between the ring $C'$ and the opposing face of the stationary plate $A^7$. I may also state that the shaft C and screw $C^2$ are rotated by means of a worm $D'$, having bearings in the standards $A^4$, bolted to the base A, which worm $D'$ threads in the worm-gear D, splined on the shaft C.

Now to more fully express the moisture from and to more completely compress the material to be treated by the press I mount upon the shaft C, at the discharge end, a frusto-conical perforated shell or collar G; but whereas the inside frusto-conical surface of the screw-press spreads outwardly toward the feed end the frusto-cone of the shell G spreads outwardly toward the discharge end—that is, the two frusto-conical surfaces spread in opposite directions. This collar has a cutaway portion $G'$ fitting against a corresponding portion of the screw-flange, so that rotation of the screw-flange rotates the collar. To support the shell against longitudinal displacement upon the shaft C, I firmly clamp upon the shaft segmental or else semicircular straps H by means of bolts $H^2$ and additional set-screws $H'$. The pressure tending to force the shell G toward the right in Fig. 1 is thus taken up by the clamp H.

In order to cut the material which has been forced through the discharge end of the press from that portion of the material which still remains in the press, I secure knives I between the segments constituted by the bands H. Thus my clamping-bands H serve the double function of holding the frusto-conical shell G against longitudinal displacement and of forcibly rotating the cutting-knives I at the discharge end of the press.

I may add that it is desirable in presses of this character to moisten the material under treatment during the first part of its journey through the press, but to express the moisture toward the exit end. For this purpose I place a plug $F'$ near the center, longitudinally considered, of the hollow shaft C, which shaft C, I supply with apertures $C^4$ for the passage of steam or moisture. Furthermore, I inclose the discharge end of the shaft C in a cap E, fitting thereagainst in a steam-tight fashion, which cap is supplied with a drain-nozzle $E^2$. The cap E is secured to a standard $A^2$. Similarly at the feed end I have the hollow shaft C fit in a steam-tight fashion within a cap E', mounted in a standard A⁵, through which cap passes a steam-pipe F. It will be understood that when steam is admitted to the pipe F it passes along the hollow shaft C, which, as has been shown, is steam-tight except for the apertures C⁴ and then out through these apertures C⁴, which lie on the feed side of the plug. The material under treatment having been moistened by the steam and having passed beyond a position corresponding to that of the plug F', the moisture therein is now expressed not only through the slots between the slats B⁴, as before, but also through the perforations in the shaft C. At the very exit end of the press there is a final intense compression and expressure of the moisture because of the perforated shell G.

It so happens that the portion of the hollow shaft on the exit side of the plug F' sometimes becomes clogged with a material which is forced through the apertures C⁴ in the shaft C. To remove such material, I run a steam-pipe P in a steam-tight fashion through the cap-plate E' and the plug F' by means of ordinary stuffing-boxes, not necessary to show. When it is desired to blow out the material from the discharge side of the plug end F', steam under sufficient pressure is passed through the pipe P, thus blowing the material out through the large discharge-nozzle E².

I have now to describe the construction at the feed end of my press. I have already explained that it consists of an extension shown in the form of a semicircular cage b' b² b⁴ on the lower side of the press, to the top of which cage is bolted a rectangular feed-box T. This feed-box covers a semicircular segment of the press; but I have discovered that any attempt to pass material through that quadrantal segment of the feed-box which corresponds to the ascending side of the screw in its rotation results in this, that the material treated fails to pass longitudinally through the press, but is rotated upwardly, opposes the material that is being fed downwardly, and causes the press to clog. For this reason I have covered that quadrantal segment of the feed-box which lies over the ascending or approaching side of the screw with a top plate T², to which top plate I have secured, by a bracket K², a bearing K' for a star-wheel K, the leaves of which are rotated by the flanges C² of the screw. The star-wheel is on that side of the feed-aperture from which the material from the bottom tends to approach. I may also prefer to employ a baffle-plate T³, the function of which is clear. I may further employ a feed-tube T⁴, set within the feed-box T, through which feed-tube T⁴ the material is fed into the press. This feed-tube has a projection T⁴⁴ to the edge of the screw, which assists in preventing the material which might be rotated upwardly on the right side of Fig. 3 from being thrown into the path of the material descending in the feed-box. I note that the feed-tube T⁴ is coextensive with a quadrantal feed-aperture in the top T². This quadrantal feed-aperture is over that quadrantal segment of the feed-screw which lies over the descending or receding side of the screw.

It will now be clear that when the material is fed into the quadrantal feed-tube T⁴ it will fall upon the slats b⁴ at the bottom of the press, whereupon the rotation of the screw will crowd the material toward the discharge end; but in so far as the friction of the blades of the screw against the material causes a lifting of the material under treatment it is seen at once that this will do no harm, for the material thus lifted cannot pass beyond the baffle-plate T³ or the projection T⁴⁴ or beyond the blades of the star-wheel K—that is to say, the material which is carried around by the screw cannot get into the path of the fresh material which is falling through the quadrantal tube T⁴, so that there will be no clogging.

I claim—

1. A continuous screw-press comprising a body which is frusto-conical at the discharge end, a screw and screw-shaft within the body, and a frusto-conical shell on the screw-shaft at the discharge end having a cut-away portion fitting against the corresponding portion of the screw, so as to be rotated thereby, substantially as described.

2. A continuous press comprising a press-body, a screw and screw-shaft therewithin, a set of segmental clamping-bands, knives between the segments, and bolts for clamping the knives between the segments and upon the screw-shaft, substantially as described.

3. A continuous screw-press comprising a press-body, a screw and screw-shaft therewithin, a frusto-conical shell surrounding the shaft at the discharge end, a set of segmental clamping-bands, knives between the segments, and bolts for clamping the knives between the segments and upon the screw-shaft to support the shell against a longitudinal displacement, substantially as described.

4. A continuous screw-press comprising a press-body, a screw and a hollow steam-tight screw-shaft therewithin, a plug centrally located in the hollow shaft, apertures in the shaft on the opposite sides of the plug, and a steam-supply at the feed end of the shaft, substantially as described.

5. A continuous screw-press comprising a press-body, a screw and a hollow apertured screw-shaft therewithin, a plug centrally located in the hollow shaft, and a steam blow-out pipe passing longitudinally through the shaft and the plug, substantially as described.

6. A continuous screw-press comprising a press-body, a screw and a hollow steam-tight screw-shaft therewithin, a plug centrally located in the hollow shaft, apertures in the shaft on opposite sides of the plug, a steam-supply at the feed end of the shaft, and a steam blow-out pipe passing longitudinally through the steam-tight shaft and plug, substantially as described.

7. A continuous screw-press comprising a press-body, a screw and hollow screw-shaft therewithin, steam-tight caps at the ends of the shaft, a plug centrally located in the hollow shaft, apertures in the shaft on opposite sides of the plug, and a steam-supply pipe passing through the cap at the feed end of the shaft, substantially as described.

8. A continuous screw-press comprising a press-body, a screw and a hollow screw-shaft therewithin, steam-tight caps at the ends of the shaft, a plug centrally located in the hollow shaft, apertures in the shaft on opposite sides of the plug, a steam-supply pipe passing through the cap at the feed end, and a steam blow-out pipe passing longitudinally through the same cap and through the plug, substantially as described.

9. A continuous screw-press comprising a press-body having an extension at the feed end, a feed-box covering a semicircular segment of the press secured above this extension, and a quadrantal feed-tube in the feed-box over the receding side of the screw, substantially as described.

10. A continuous screw-press comprising a press-body, having an extension at the feed end, a feed-box covering a semicircular segment of the press secured above this extension, and a feed-aperture in the box above that quadrantal segment only which lies over the receding side of the screw, substantially as described.

11. A continuous screw-press comprising a press-body having an extension at the feed end, a feed-box covering a semicircular segment of the press secured above this extension, a feed-aperture in the box above that quadrantal segment which lies over the receding side of the screw, and a star-wheel having leaves meshing with the flanges of the screw on the approaching side of the feed-aperture, substantially as described.

12. A continuous screw-press comprising a press-body having an extension at the feed end, a feed-box covering a semicircular segment of the press secured above this extension, a top for the box having an aperture over that quadrantal segment which lies over the receding side of the screw, a bearing secured to the under side of this top, and a star-wheel rotating in the bearing having leaves meshing with the flanges of the screw, substantially as described.

13. A continuous screw-press comprising a press-body having an extension at the feed end, a feed-box covering a semicircular segment of the press secured above this extension, and a quadrantal feed-tube in the feed-box over the receding side of this screw, having a projection to the edge of the screw, substantially as described.

14. A continuous screw-press comprising a press-body, a feed-box covering a semicircular segment of the press having a feed-aperture in the box over the receding side of the screw, and a baffle-plate and star-wheel for preventing clogging, substantially as described.

15. A continuous screw-press comprising a press-body, a screw-shaft and screw therewithin, a feed-box having a feed-aperture over the receding side of the screw, and a star-wheel, meshing with the screw in the feed-box on the screw-approaching side of the feed-opening, substantially as described.

In testimony whereof I have signed my name to this specification in the presence of two subscribing witnesses.

JOSEPHUS F. BUSSELLS.

Witnesses:
G. R. TUSKA,
W. H. HESSEN.